Oct. 6, 1931.  T. GENSMER  1,825,789
AUTOMATIC GEARLESS TRANSMISSION
Filed April 9, 1928    4 Sheets-Sheet 3
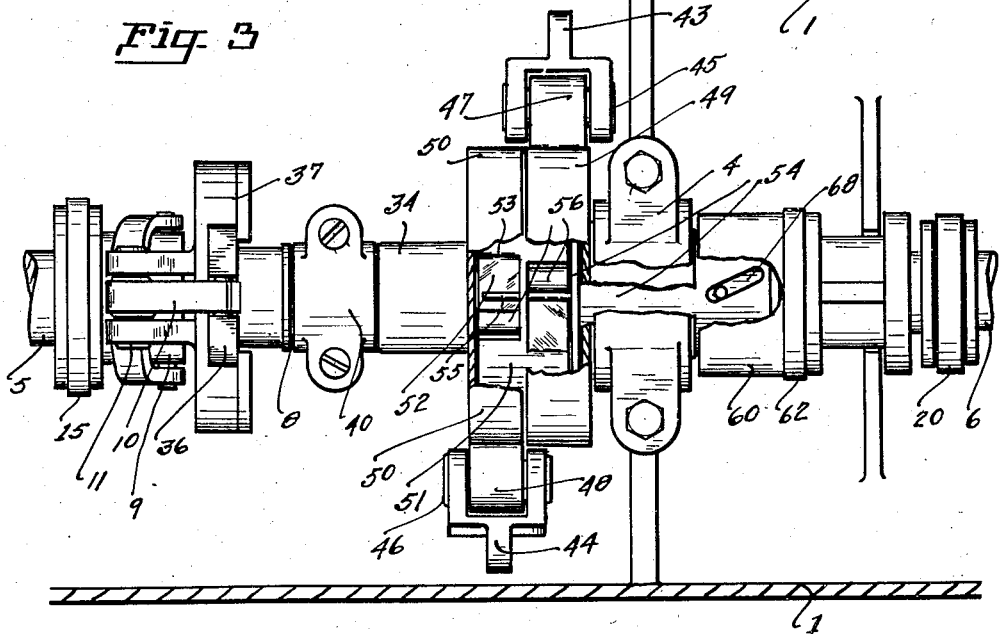
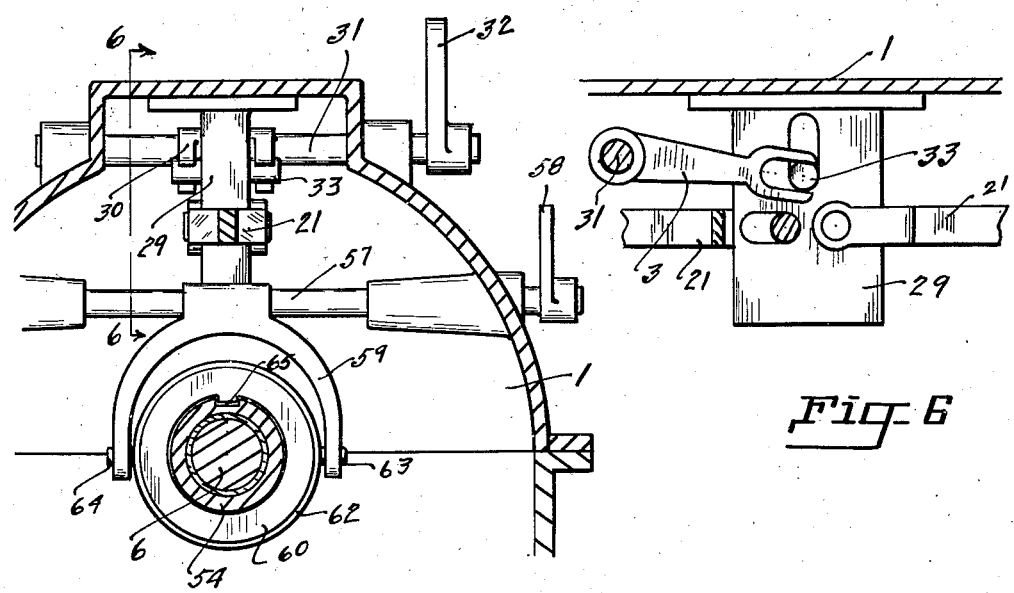
Inventor
Theodore Gensmer
By Thomas Gilgen
Attorney Oct. 6, 1931. T. GENSMER 1,825,789
AUTOMATIC GEARLESS TRANSMISSION
Filed April 9, 1928 4 Sheets-Sheet 4
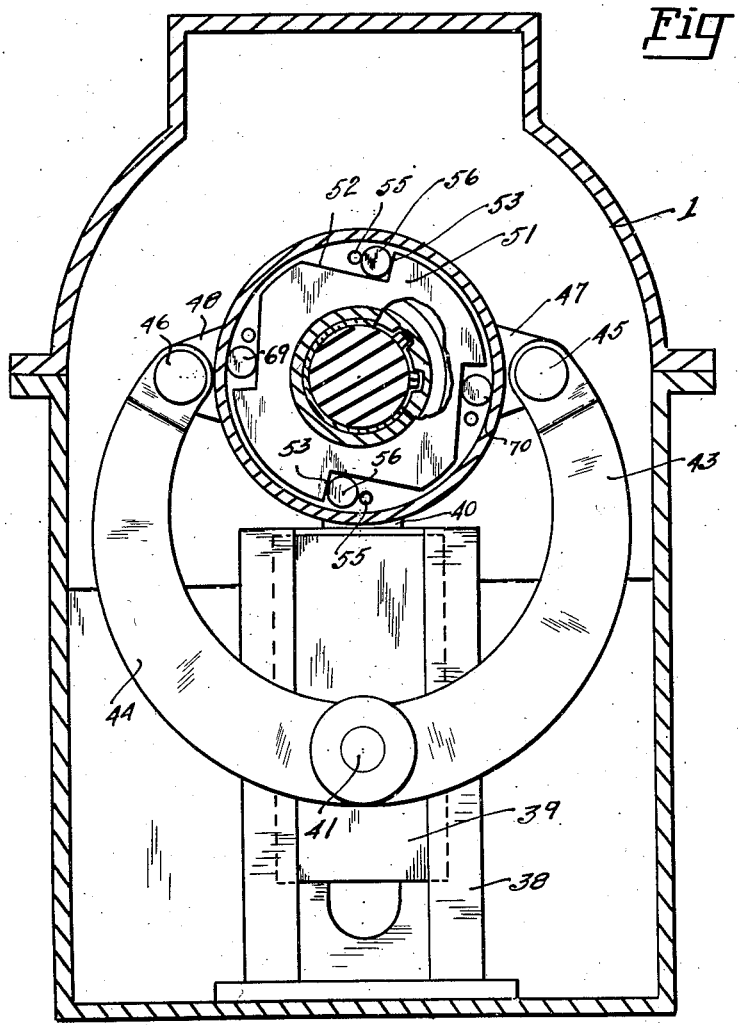
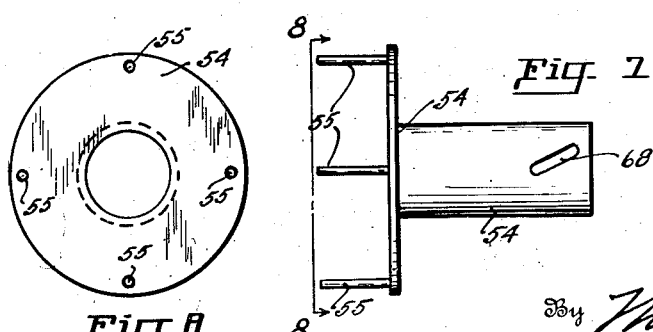
Inventor
Theodore Gensmer
By Thomas Bilyeu
Attorney Patented Oct. 6, 1931

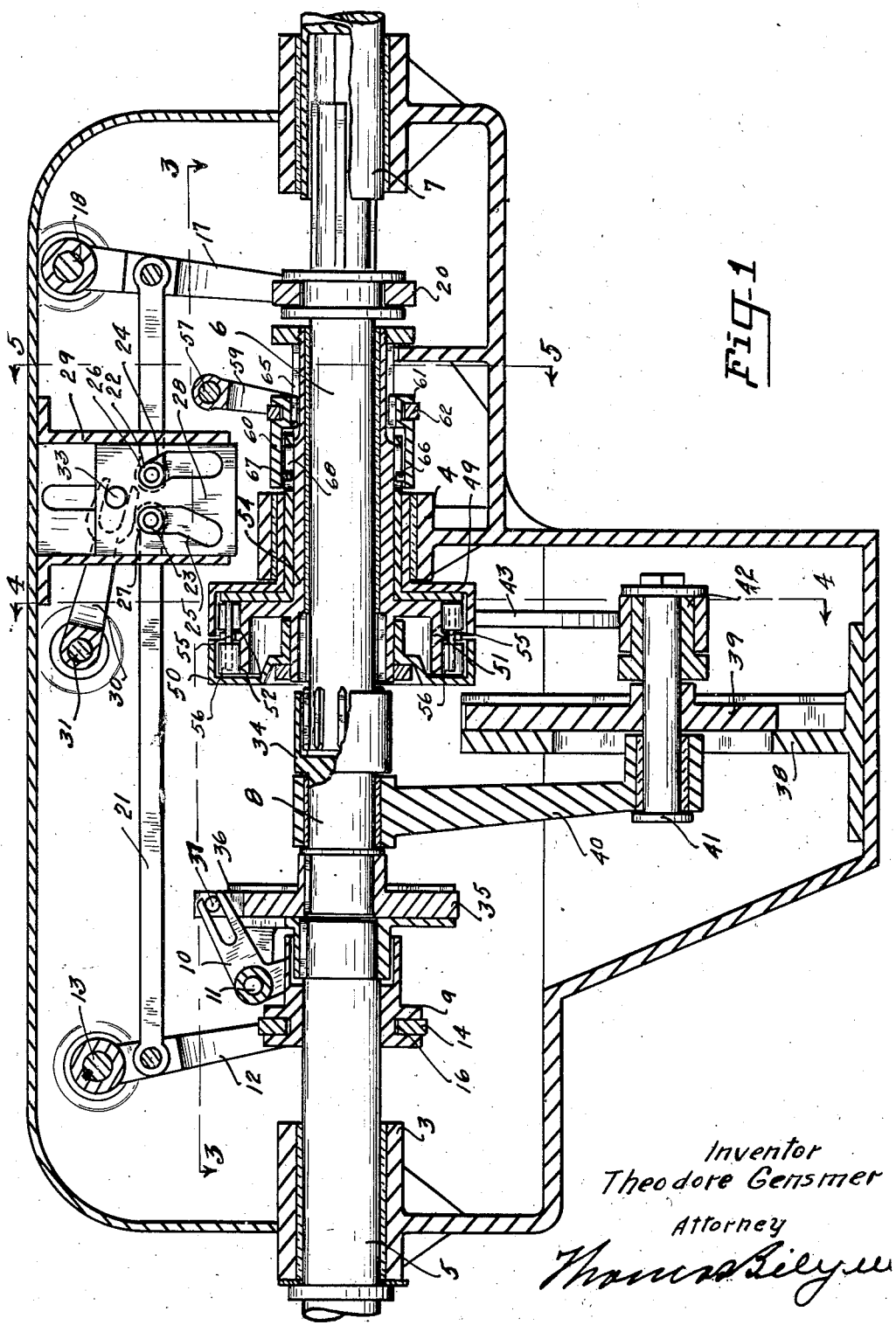

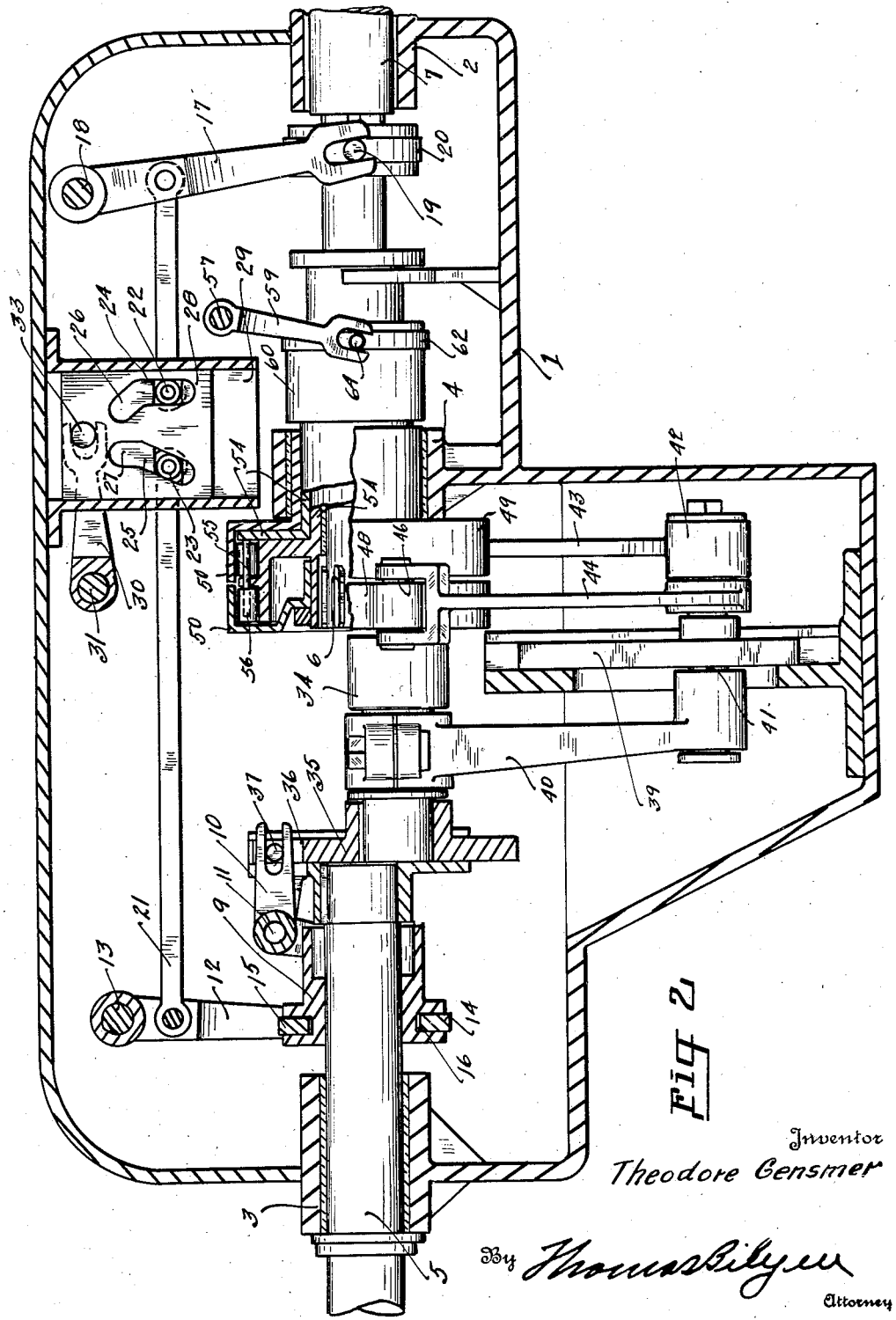

1,825,789

UNITED STATES PATENT OFFICE

THEODORE GENSMER, OF PORTLAND, OREGON

AUTOMATIC GEARLESS TRANSMISSION

Application filed April 9, 1928. Serial No. 268,723.

The primary purpose and object of my new and improved device resides in a transmission for automotive equipment adapted to transmitting a number of different speed ratios in the absence of gear elements.

A further object of my new and improved transmission resides in the fact that no moving parts, other than the direct driving elements, are in movement in the direct drive or high speed transmission.

A further object of my new and improved device consists in a transmission element that is relatively noiseless in its operation.

And a further object resides in having a relatively large number of intermediate speed ratios between high and low.

A further object of my new and improved device resides in the fact that no clutch is necessary in the transmission unit or to be disposed between the rear axle and the motor in that the device itself may be successfully used as a transmission element and forms a clutch at one and the same time and it is also susceptible of being used as a brake when the machine upon which the same is mounted has the engine or motive dead.

In a modified form to that illustrated in the drawings, the device is also susceptible of having an overdrive placed therein.

A further object resides in the fact that the device cannot be jammed in the shifting of from one speed ratio to the other.

And a further object resides in the construction that is susceptible of being operated in a casing filled with lubricating materials that tend to a long life of the device and to make the same relatively free from noise in operation and that may be run over relatively long operating periods without alteration or repair.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a longitudinal, sectional view, of the assembled device, illustrating the same in relatively high gear.

Fig. 2 is a longitudinal, sectional view, of the assembled device showing the same in relatively low gear.

Fig. 3 is a top, plan view, partially in section of the assembled device.

Fig. 4 is a cross section view, taken on line 4—4 of Fig. 1, looking in the direction indicated.

Fig. 5 is a fragmentary, sectional view, taken on line 5—5 of Fig. 1, looking in the direction indicated.

Fig. 6 is a side view, taken on line 6—6 of Fig. 5, looking in the direction indicated.

Fig. 7 is a side view of the engaging spider element, the same being shown detached from the assembly.

Fig. 8 is an end view, taken on line 8—8 of Fig. 7, looking in the direction indicated.

Like reference characters refer to like parts throughout the several views.

I preferably form my device of a housing 1, which is made of metal, and all joints in the housing are made sufficiently tight to maintain the lubricating material therein for properly lubricating the engaging and moving parts. Bearings 2 and 3 are disposed in the opposite ends of the case for journaling the shaft elements disposed therein and an intermediate bearing 4, is disposed within the case for journaling the floating intermediate shaft. The shaft 5 journaled within the bearing 3, leads to the prime mover and is the driving shaft. The driving shaft is in registerable alignment with the floating shaft 6, and the floating shaft 6 is in registerable alignment with the tail shaft 7 journaled within the bearing 2. A secondary shaft 8 is in registerable alignment and in abutting engagement with the driving shaft 5 and the floating shaft 6. Disposed about the driving shaft 5 is a collar 9, which also carries a bell crank 10. The bell crank is journaled about the supporting pin 11. A clutch arm 12 is journaled about a supporting shaft 13 and the forks 14 and 15 of the clutch arm engage within a slot 16 of the collar 9. A second clutch arm 17 journaled about a supporting shaft 18 has bifurcated ends which engage with bearing pins 19 disposed upon the collar 20, and a link 21 connects the clutch arms 12 and 17. The link 21 carries outwardly projecting pins 22 and 23, which have roller bearings 24 and 25 disposed thereupon, the roller bearings engaging within slots 26 and 27 of the slide 28. The slide 28 is housed within a guideway 29, and is adapted to having movement imparted thereto relative to that of the guideway 29. The link 21 is made in two parts, as illustrated in Fig. 2, and movement is imparted to the slide 28 through the arm 30. The arm 30 is secured to the shaft 31. The shaft 31 is adapted to be manually moved from the exterior of the case by a hand operating lever 32. The lever 32 is adapted to either hand or foot operation. The arm 30 carries a bifurcated end which is adapted to slidable contact with the pin 33 disposed upon the slide 28. The primary purpose and object of the sliding is to form engagement and disengagement of the collar 9, on its engaging end with that of the male driving elements. Each of the slots 26 and 27 are in reality cam surfaces, against which the rollers 24 and 25 are actuated and as the slide 28 is manipulated, movement is imparted respectively to the links 21, but at different rates and at different times so that movement is imparted at different points of the travel of the operating levers 12 and 17, depending upon the degree to which the lever secured to the shaft 31 is actuated.

The actuating of the bifurcated lever 17 imparts an endwise movement to the floating shaft 6, and when movement sufficiently disengages the shaft 6, from the husk. The husk 34 is integral with the stub shaft 8. The stub shaft 8 outwardly projects and forms a part of the guide head 35. The guide head 35 has an arm 36 carrying the journal pin 37 that actuates in conjunction with the arm 10. The arm 10 is bifurcated its ends to adapt the same to work about the journal pin 37. The amount of offset that the head has to the driving center determines the input and output power ratios and therefore the speed ratios of the device.

A guide head 38 is formed in the base of the housing 1, in which a crosshead or slide 39 is reciprocated. The connecting rod 40 disposed about the shaft 8 is thrown off center. Upon the oppositely disposed side of the crosshead 39 is a second journal bearing 42, which has arms 43 and 44, illustrated in Fig. 4 attached, and as the crosshead 39 is reciprocated an up and down movement is imparted to the arms 43 and 44. The upper ends of the arms 43 and 44 are secured to journal pins 45 and 46. The pins 45 and 46 are secured to the arms or lugs 47 and 48, also illustrated in Fig. 4.

Referring to Fig. 3, the arm 43 is secured indirectly to an over-running clutch housing 49, and the arm 44 is indirectly secured to the over-running clutch housing 50. Each of the over-running clutch housings carry or have disposed therein a multiple faced rotor ring 51, each having a plurality of camming surfaces 52 disposed thereupon and each of the elements 51 are secured to the shaft 6, when any reduction speed ratio is being used below direct drive. Each of the elements 51 have a substantially right angle wall 53 disposed thereupon which is at right angles to the camming surface 52. One of the elements 51 is adapted to a right hand drive and the oppositely disposed one is adapted to a left hand drive, so that as the same are actuated by the oppositely disposed arms 43 and 44 each of the elements 51 are adapted to drive the shaft 6 in one and the same direction.

Referring to Fig. 7 and Fig. 8 for a detailed description of the same, a spider 54 is disposed within the over-running clutch elements having outwardly projecting actuator pins 55. The actuator pins 55 are also shown in end view in Fig. 4, which are adapted to coact with and position the rollers 56. Running transversely of the housing is an actuating shaft 57, which extends outwardly through the case and as the operating lever 58 secured thereto, the manipulation of the lever 58 rocks the shaft 57. Secured to the shaft 57 is an actuating arm 59. A second spider element 60 is disposed indirectly about the shaft 6, having a groove 61 disposed therein into which the actuating ring collar 62, is disposed. The ring collar 62 has outwardly projecting actuator pins 63 and 64 disposed therein which coact with the arm 59. The spider 60 is adapted to manual manipulation longitudinal of the shaft about the spline key 65. Inwardly extending from the spider 60 are a plurality of pins 66 and 67, illustrated in Fig. 1, which are adapted to engage in the slots 68 of the spider 54. The spider 60 is disposed about a sleeve rearwardly extending from the element 51 and the movement of the spider 60 longitudinally relative to the sleeve 56, positions the pins 66 and 67 within the slot 68 of the spider 54. The slot 68 being at an angle to the center line of the shaft partially rotates the spider 54 and therefore the outwardly projecting elements 55 secured thereto which also positions the rollers 56 relative to the camming surfaces 52 of the clutch elements. The primary purpose and object of the rollers 69 and 70, illustrated in Fig. 4, is to reverse the direction of drive of the driven shaft 6. The direct drive is obtained by the engagement of the rollers 56 with the vertical walls 53 and the reverse drive is obtained by the engagement of the rollers 69 and 70 with the inner peripheral surface of the housing element.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What I claim is:—

1. In a device of the class described, the combination of a relatively lubricant tight housing element, a plurality of shafts disposed within the housing and journaled relative thereto, said shafts being disposed in continuous alignment one being a driven shaft and the other a driving shaft, means for shifting one of the shaft elements longitudinally to make and break the shaft continuity as a driving element, a guide head shiftable transversely of the shaft alignment, a driving arm for said head, a cross head, a connecting rod disposed between the guide head and the cross head for imparting a reciprocating movement to the cross head as the rotatable guide head is rotated an over-running clutch element, and arms coacting with the over-running clutch element and the cross head for imparting rotation to the over-running clutch as the cross head is reciprocated to change the speed ratios between the driving shaft and the driven shaft to which the over-running clutch is indirectly secured.

2. In a device of the class described, the combination of a common housing, a drive shaft journaled relative to the housing, a floating shaft in registerable alignment with the drive shaft, a tail shaft in registerable alignment with the floating shaft and journaled relative to the housing, a secondary shaft in registerable alignment and in abutting engagement with the driving shaft and the floating shaft, means for shifting one of the shaft elements longitudinally to make and break the shaft continuity as a driving element, a guide head shiftable transversely of the shaft alignment, a driving arm for said head, a cross head, a connecting rod disposed between the guide head and the cross head for imparting a reciprocating movement to the cross head as the rotatable guide head is rotated an over-running clutch element, and arms coacting with the over-running clutch element and the cross head for imparting rotation to the over-running clutch as the cross-head is reciprocated to change the speed ratios between the driving shaft and driven shaft to which the over-running clutch is indirectly secured.

3. In a device of the class described, the combination of a common housing, a drive shaft journaled relative to the housing, a floating shaft in registerable alignment with the drive shaft, a tail shaft in registerable alignment with the floating shaft and journaled relative to the housing, a secondary shaft in registerable alignment and in abutting engagement with the drive shaft and the floating shaft, an over-running clutch element mounted on the floating shaft, a guide head shiftable transversely of the shaft alignment, a driving arm for said head, a crosshead, a connecting rod disposed between the guide head and the cross head for imparting a reciprocating movement to the cross head as the rotatable guide head is rotated, arms coacting with the over-running clutch element and the cross head for imparting rotation to the over-running clutch as the cross head is reciprocated to change the speed ratios between the driving shaft and driven shaft to which the over-running clutch is indirectly secured, a spider element disposed within the over-running clutch elements, and means for manipulating the spider element so as to create a reverse drive.

THEODORE GENSMER.